(12) United States Patent
Kim

(10) Patent No.: US 11,373,280 B2
(45) Date of Patent: Jun. 28, 2022

(54) ELECTRONIC DEVICE AND METHOD OF TRAINING A LEARNING MODEL FOR CONTRAST RATIO OF AN IMAGE

(71) Applicant: SAMSUNG ELECTRONICS CO., LTD., Suwon-si (KR)

(72) Inventor: Bongjoe Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 16/872,573

(22) Filed: May 12, 2020

(65) Prior Publication Data

US 2020/0364837 A1    Nov. 19, 2020

(30) Foreign Application Priority Data

May 16, 2019 (KR) ........................ 10-2019-0057448

(51) Int. Cl.
  *G06T 7/00*   (2017.01)
  *G06T 5/00*   (2006.01)
(52) U.S. Cl.
  CPC .......... *G06T 5/009* (2013.01); *G06T 2200/24* (2013.01); *G06T 2207/20081* (2013.01)
(58) Field of Classification Search
  CPC .... G06K 9/6256; G06N 3/0454; G06N 20/00; G06T 2207/20081
  See application file for complete search history.

(56) References Cited

U.S. PATENT DOCUMENTS 6,826,310 B2   11/2004   Trifonov et al.
7,221,807 B2   5/2007    Campbell
(Continued)

FOREIGN PATENT DOCUMENTS

EP    1 486 914 A1    12/2004
JP    2004212598 A    7/2004
(Continued)

OTHER PUBLICATIONS

J. Cai, S. Gu and L. Zhang, "Learning a Deep Single Image Contrast Enhancer from Multi-Exposure Images," in IEEE Transactions on Image Processing, vol. 27, No. 4, pp. 2049-2062, Apr. 2018, doi: 10.1109/TIP.2018.2794218.*

(Continued)

*Primary Examiner* — Li Liu
(74) *Attorney, Agent, or Firm* — Sughrue Mion, PLLC

(57) ABSTRACT

An electronic device is provided. The electronic device may include at least one processor, and at least one memory. The at least one processor may be configured to execute the instructions stored in the at least one memory, to: acquire an input image, predict an inverse function of a monotonically increasing function for decreasing an image contrast ratio by applying the input image to a learning model trained by using an artificial intelligence algorithm, and acquire an output image based on the input image and the predicted inverse function of the monotonically increasing function. The learning model may be trained to predict the inverse function of the monotonically increasing function for decreasing the an image contrast ratio by using a training image generated by applying a target image having a high contrast ratio to the monotonically increasing function and the inverse function of the monotonically increasing function as training data.

20 Claims, 12 Drawing Sheets

(56) References Cited

U.S. PATENT DOCUMENTS

| | | | |
|---|---|---|---|
| 7,382,382 | B2 | 6/2008 | Furukawa et al. |
| 7,609,908 | B2 | 10/2009 | Luo et al. |
| 7,835,576 | B2 | 11/2010 | Kang et al. |
| 2004/0150602 | A1 | 8/2004 | Furukawa et al. |
| 2019/0102678 | A1 | 4/2019 | Chang et al. |
| 2019/0108621 | A1 | 4/2019 | Condorovici |
| 2020/0090313 | A1* | 3/2020 | Bugdary .................. G06T 9/002 |
| 2020/0160105 | A1* | 5/2020 | Kehl .................... G06K 9/6256 |
| 2020/0160544 | A1* | 5/2020 | Yao ........................ G06T 11/206 |
| 2020/0175366 | A1 | 6/2020 | Hida |

FOREIGN PATENT DOCUMENTS

| | | |
|---|---|---|
| JP | 2009-004888 A | 1/2009 |
| KR | 10-0679052 B1 | 1/2007 |
| KR | 10-1558653 B1 | 10/2015 |
| KR | 10-1874538 B1 | 7/2018 |
| KR | 1020200094608 A | 8/2020 |

OTHER PUBLICATIONS

Communication dated Oct. 20, 2021 issued by the European Patent Office in European Application No. 20805353.8.

Kinoshita, Y., et al., "Image Enhancement Network Trained by Using HDR Images", Cornell University Library, Jan. 17, 2019, XP081003559, 5 pages.

Andrey Ignatov et al. "DSLR-Quality Photos on Mobile Devices with Deep Convolutional Networks" ICCV, 2017, (9 pages total).

International Search Report and Written Opinion dated Aug. 13, 2020, issued by the International Searching Authority in International Application No. PCT/KR2020/095083 (PCT/ISA/210 and PCT/ISA237).

Lundervold et al., An overview of deep learning in medical imaging focusing on MRI, arXiv:1811.10052v2, Dec. 2018, total 45 pages.

Cai et al., "Learning a Deep Single Image Contrast Enhancer from Multi-Exposure Images," IEEE Transactions on Image Processing, Jan. 2018, total 15 pages.

* cited by examiner $$y = \begin{cases} \alpha - \alpha(1 - \frac{x}{\alpha})^\lambda & \text{if } x \leq \alpha \\ \alpha + (1 - \alpha)\left(\frac{x - \alpha}{1 - \alpha}\right)^\lambda & \text{otherwise} \end{cases}$$

ELECTRONIC DEVICE AND METHOD OF TRAINING A LEARNING MODEL FOR CONTRAST RATIO OF AN IMAGE

CROSS-REFERENCE TO RELATED APPLICATIONS

This application is based on and claims priority under 35 U.S.C. § 119 to Korean Patent Application No. 10-2019-0057448, filed on May 16, 2019, in the Korean Intellectual Property Office, the disclosure of which is incorporated by reference herein in its entirety.

BACKGROUND

1. Field

The disclosure relates to an electronic device and a method of controlling thereof, and more particularly relates to a method for training a learning model for increasing a contrast ratio of an input image.

2. Description of Related Art

An image having a low contrast ratio and an image that is the same as the above image but having an enhanced contrast ratio may be matched with each other by using an artificial intelligence algorithm and used as training data for a learning model for increasing a contrast ratio of an input image.

When sufficient training is completed, an electronic device may generate an output image obtained by increasing a contrast ratio of an input image by applying the input image to the learning model.

SUMMARY

When training a learning model by using an artificial intelligence algorithm by matching an image having a low contrast ratio with an image having a high contrast ratio, it may be inconvenient to manually generate the image having a high contrast ratio with respect to the image having a low contrast ratio.

In addition, a size of an algorithm for executing training by matching the image having a low contrast ratio with the image having a high contrast ratio may increase in proportion to a size of data and this may cause inconvenience of an increase in complexity of the learning model and an amount of memory used.

According to an embodiment, there is provided an electronic device including at least one or more processors, and at least one or more memories, in which the memory stores at least one or more instructions set to allow the processor to predict an inverse function of a monotonically increasing function for decreasing a contrast ratio of an input image by applying the input image to a learning model trained by using an artificial intelligence algorithm, and the learning model is trained to predict an inverse function of a monotonically increasing function for decreasing a contrast ratio of an input image by using a training image having a low contrast ratio generated by applying a target image having a high contrast ratio to a monotonically increasing function and the inverse function of the monotonically increasing function as training data.

According to another embodiment, there is provided a method for controlling an electronic device, the method including, based on a target image having a high contrast ratio being acquired, acquiring a monotonically increasing function for decreasing a contrast ratio of the target image, acquiring a training image having a low contrast ratio by applying the target image to the monotonically increasing function, and making the training image correspond to an inverse function of the monotonically increasing function and using the training image and the inverse function of the monotonically increasing function as training data for a learning model for increasing a contrast ratio of an input image.

According to embodiments, the electronic device may acquire a monotonically increasing function for generating an image having a low contrast ratio by using a target image having a high contrast ratio.

According to embodiments, the electronic device may acquire a plurality of training images by using a plurality of monotonically increasing functions.

According to embodiments, the electronic device may train a learning model by using a training image and an inverse function of a monotonically increasing function, with which the training image is generated, as training data.

According to an embodiment, an electronic device may include at least one processor, and at least one memory. According to an embodiment, the at one processor may be configured to execute the instructions stored in the at least one memory, to: acquire an input image, predict an inverse function of a monotonically increasing function for decreasing an image contrast ratio by applying the input image to a learning model trained by using an artificial intelligence algorithm, and acquire an output image based on the input image and the predicted inverse function of the monotonically increasing function.

According to an embodiment, the learning model may be trained to predict the inverse function of the monotonically increasing function for decreasing the image contrast ratio by using a training image generated by applying a target image having a high contrast ratio to the monotonically increasing function and the inverse function of the monotonically increasing function as training data.

According to an embodiment, the at least one processor may be further configured to generate the output image having an increased contrast ratio by applying the input image to the predicted inverse function of the monotonically increasing function.

According to an embodiment, the at least one processor may be further configured to train the learning model by inputting the training image, the inverse function of the monotonically increasing function, and the learning model to a learning machine.

According to an embodiment, the monotonically increasing function may comprise at least one constant value, and the at least one processor may be further configured to acquire a plurality of monotonically increasing functions by changing the at least one constant value.

According to an embodiment, the at least one processor may be further configured to acquire a plurality of training images by applying the target image to the plurality of monotonically increasing functions.

According to an embodiment, the at least one processor may be further configured to adjust a brightness value of pixels having a higher brightness value than an average brightness value of pixels included in the input image to be lower by using the monotonically increasing function.

According to an embodiment, the at least one processor may be further configured to adjust a brightness value of pixels having a lower brightness value than an average brightness value of pixels included in the input image to be higher by using the monotonically increasing function.

According to an embodiment, the electronic device may further comprise a display. According to an embodiment, the at least one processor may be further configured to control the display to display the output image and an object for adjusting a contrast ratio of the output image.

According to an embodiment, the at least one processor may be further configured to control the display to display the output image by adjusting the contrast ratio of the output image based on receiving an external input by using the object.

According to an embodiment, the at least one processor may be further configured to reflect the adjusted contrast ratio to the predicted inverse function of the monotonically increasing function, and use the input image and the inverse function of the monotonically increasing function for the adjusted contrast ratio as training data.

According to an embodiment, a method for controlling an electronic device is provided. The method may comprise: based on a target image having a high contrast ratio being acquired, acquiring a monotonically increasing function for decreasing an image contrast ratio; acquiring a training image having a low contrast ratio by applying a target image to the monotonically increasing function; and using the training image and an inverse function of the monotonically increasing function as training data for a learning model for increasing a contrast ratio of an input image.

According to an embodiment, the method may further comprise: predicting the inverse function of the monotonically increasing function for decreasing the image contrast ratio by applying the input image to the learning model trained using the training data.

According to an embodiment, the method may further comprise: generating an output image having an increased contrast ratio by applying the input image to the predicted inverse function of the monotonically increasing function.

According to an embodiment, the method may further comprise: training the learning model by inputting the training image, the inverse function of the monotonically increasing function, and the learning model to a learning machine.

According to an embodiment, the monotonically increasing function may comprise at least one constant value, and the method further comprise acquiring a plurality of monotonically increasing functions by changing the at least one constant value.

According to an embodiment, the method may further comprise: acquiring a plurality of training images by applying the target image to the plurality of monotonically increasing functions.

According to an embodiment, the method may further comprise: adjusting a brightness value of pixels having a higher brightness value than an average brightness value of pixels included in the input image to be lower or adjusting a brightness value of pixels having a lower brightness value than the average brightness value of pixels included in the input image to be higher by using the monotonically increasing function.

According to an embodiment, the method may further comprise: displaying an object for adjusting a contrast ratio of the output image together with the output image.

According to an embodiment, the method may further comprise: providing the output image by adjusting the contrast ratio of the output image based on receiving an external input by using the object.

According to an embodiment, the method may further comprise: reflecting the adjusted contrast ratio to the predicted inverse function of the monotonically increasing function; and using the input image and the inverse function of the monotonically increasing function for the adjusted contrast ratio as training data.

BRIEF DESCRIPTION OF THE DRAWINGS

The above and other aspects, features and advantages of certain embodiments of the disclosure will become more apparent from the following description taken in conjunction with the accompanying drawings, in which.

DETAILED DESCRIPTION

Figure 1:
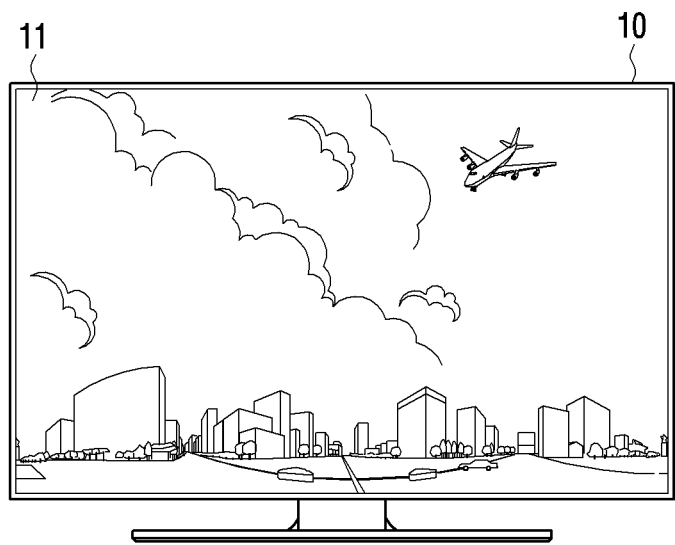
FIG. 1 is a view of an electronic device according to an embodiment.

An electronic device according to various embodiments disclosed in this disclosure may be various types of devices. The electronic device may include, for example, a mobile communication device (e.g., smartphone), a computer device, a mobile multimedia device, a mobile medical device, a camera, a wearable device, or a home appliance. The electronic device according to an embodiment of the disclosure is not limited to the abovementioned devices.

It should be noted that the embodiments of the disclosure and terms used herein are not for limiting the technical features disclosed in the disclosure to a specific embodiment, but they should be interpreted to include all modifications, equivalents and/or alternatives of the embodiments of the disclosure. In relation to explanation of the drawings, similar reference numerals may be used for similar or related elements. Unless otherwise clearly noted, singular expression corresponding to an item may include one item or a plurality of items. In this disclosure, expressions such as "A or B", "at least one of A and B", "at least one of A or B", "A, B, or C", "at least one of A, B, and C", and "at least one of A, B, or C" may include any one or all possible combinations of the listed items. The expressions "first," "second" and the like used in the disclosure may be used to simply distinguish one element from another, and does not limit the elements in terms of other aspects (e.g., order and/or importance). If it is described that a certain element (e.g., first element) is "operatively or communicatively coupled with/ to or connected to" or is "coupled with/to or connected to" another element (e.g., second element), it may mean that the certain element may be connected to the other element directly (e.g., in a wired manner), in a wireless manner, or may be connected through a third element.

The term "module" used in this disclosure may include a unit implemented with hardware, software, or firmware and may be interchangeably used with terms, for example, logic, logic blocks, parts, or circuits. The module may be a part integrally formed or a minimum unit or a part of the part performing one or more functions. For example, according to an embodiment, the module may be implemented as an application-specific integrated circuit (ASIC).

FIG. 1 is a view of an electronic device according to an embodiment.

According to an embodiment, an electronic device 10 may be a television (TV), but this is merely an example, and the electronic device 10 may be implemented in various forms including a display 11. For example, the electronic device 10 may be implemented as various electronic devices such as a mobile phone, a tablet personal computer (PC), a digital camera, a camcorder, a laptop computer, a tablet PC, a desktop PC, an electronic book (e-book) terminal, a digital broadcasting terminal, a personal digital assistant (PDA), a portable multimedia player (PMP), a navigation system, an MP3 player, a server, a set-top box, or a wearable device. In particular, the embodiment may be easily implemented in a display device such as a TV having a large display screen, but there is no limitation thereto.

In addition, the electronic device 10 may be a fixed type or a movable type and may be a digital broadcast receiver for receiving digital broadcasts. Further, the electronic device 10 may include not only a flat display but also a curved display which is a display having a curvature or a flexible display having an adjustable curvature. An output resolution of the electronic device 10, for example, includes high definition (HD), Full HD, Ultra HD, or a resolution having a higher sharpness than Ultra HD.

The electronic device 10 may include a processor and a communicator to perform communication with an external device. The communicator may include wireless communication modules (e.g., cellular communication module, infrared wireless communication module (e.g., BLE (Bluetooth low energy) communication module, or Wi-Fi (wireless fidelity) communication module) and wired communication modules (e.g., local area network (LAN) communication module, or power line communication module). Classic Bluetooth may also be used.

Figure 2:
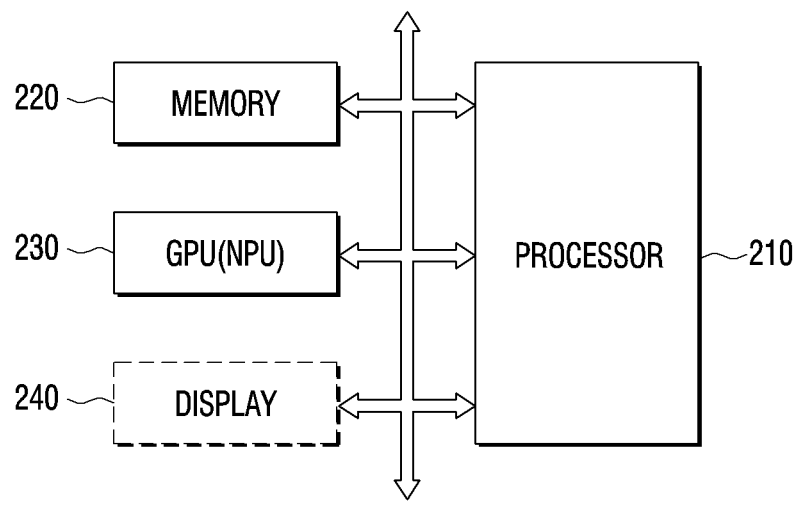
FIG. 2 is a schematic block diagram of the electronic device according to an embodiment.

FIG. 2 is a schematic block diagram of the electronic device according to an embodiment.

Referring to FIG. 2, the electronic device 10 may include a processor 210, a memory 220, and a graphics processing unit (GPU) (or neural-network processing unit (NPU)) 230. But there is no limitation thereto. The electronic device 10 may further include at least one or more elements or may not include some elements. For example, the electronic device 10 may further include a display 240.

According to an embodiment, the memory 220 may store a training image and an inverse function of a monotonically increasing function. According to embodiments, the memory 220 may store a learning model. The training image may be, for example, an image generated by using a monotonically increasing function.

According to an embodiment, the GPU (or NPU) 230 may be a processor optimal for calculation for artificial intelligence.

The artificial intelligence technologies are composed of machine learning (e.g., deep learning) and elementary technologies using the machine learning. The machine learning is an algorithm technology of self-classifying/self-training features of input data, and the elementary technology is a technology of simulating functions of the human brain such as recognition or determination using the machine learning algorithm such as the deep learning and is composed of technical fields of language understanding, visual understanding, inference/prediction, knowledge representation, operation control, and the like.

According to an embodiment, the GPU (NPU) 230 may store a learning model in a hardware form or acquire (obtain) and use a learning model stored in the memory 220. The GPU (or NPU) 230 may be a processor that is more integrated or has less delay, improved performance, or a larger amount of resources than a general processor. In addition, the GPU (or NPU) 230 may be, for example, a processor optimal for matrix calculation for the artificial intelligence.

According to an embodiment, the GPU (or NPU) 230 may predict an inverse function of a monotonically increasing function for decreasing a contrast ratio (CR) of an input image by applying the input image to a learning model trained by using an artificial intelligence algorithm based on the control of the processor 210. The inverse function of the monotonically increasing function may increase the contrast ratio of the input image, since the monotonically increasing function is set to decrease the contrast ratio of the input image.

The contrast ratio may, for example, indicate a difference between a brightest part and a darkest part expressed by the display 240. Decreasing the contrast ratio means, for example, decreasing a brightest region or decreasing a darkest region expressed by the display 240. Increasing the contrast ratio means, for example, increasing the brightest region expressed by the display 240 or increasing the darkest region expressed by the display 240.

According to an embodiment, the processor 210 may acquire (obtain) the training image stored in the memory 220 and the inverse function of the monotonically increasing function and transmit these to the GPU (or NPU) 230. For example, the processor 210 may generate copies of the training image and the inverse function of the monotonically increasing function and transmit these to the GPU (or NPU) 230.

According to an embodiment, the processor 210 may predict an inverse function of a monotonically increasing function for decreasing a contrast ratio of an input image by applying the input image to a learning model trained by using an artificial intelligence algorithm. In this case, the learning model may be trained to predict an inverse function of the monotonically increasing function for decreasing a contrast ratio of an input image by using a training image generated by applying a target image to a monotonically increasing function and an inverse function of the monotonically increasing function as training data.

According to an embodiment, the processor 210 may generate an output image having an increased contrast ratio by applying the input image to the predicted inverse function of the monotonically increasing function for decreasing a contrast ratio of an input image, by using the GPU (or NPU) 230.

According to various embodiments, the processor 210 may execute additional image processing with respect to the generated output image. For example, the processor 210 may execute a process of identifying a region having a pixel value changed by a set value or more by comparing the input image with the output image and adjusting the pixel value of the identified region.

According to an embodiment, the display 240 may display the input image or the output image under the control of the processor 210. The display 240 may include the display 11 of FIG. 1.

Figure 3:
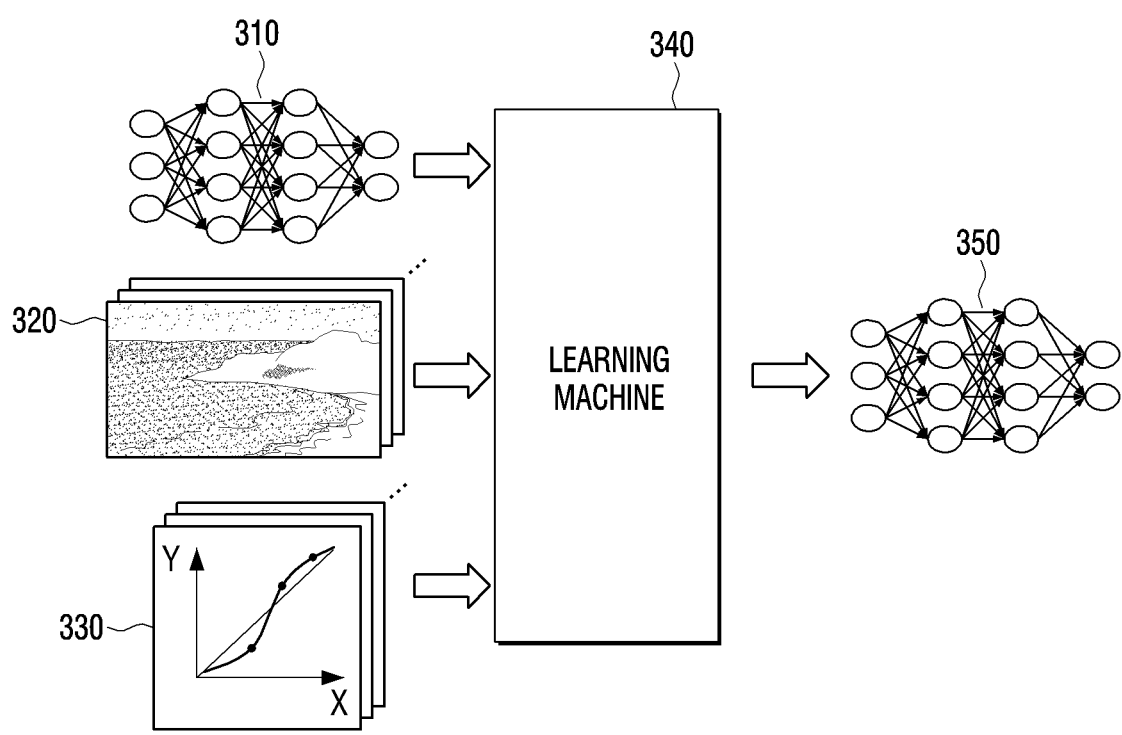
FIG. 3 is a view describing a situation in which the electronic device trains a learning model according to an embodiment.

FIG. 3 is a view describing a situation in which the electronic device trains a learning model according to an embodiment.

According to an embodiment, the electronic device 10 may input a learning model 310 stored in the memory 220 or the GPU 230 and training data (e.g., training image 320 and a reverse function 330 of monotonically increasing function) stored in the memory 220 to a learning machine 340. The learning machine 340 may correspond to the GPU 230. Although referred to throughout the disclosure as the training image 320 and the reverse function 330, respectively, the number of the training image(s) 320 may be one or more, and the number of the reverse function(s) 330 of the monotonically increasing function may be one or more. In addition, the training image 320 and the reverse function 330 of the monotonically increasing function may be stored in the memory 220 to correspond with each other as a pair. The learning machine 340 may be, for example, an algorithm set to train the learning model 310 by inputting pieces of the training data 320 and 330 into the learning model 310.

The learning model 310 may be, for example, a general learning model trained to predict a function for increasing a contrast ratio of an image when the image is input. The learning model 310 may be mounted by a manufacturer when manufacturing the electronic device 10. In addition, the learning model 310 may be acquired by the electronic device 10 from an external device.

The training image 320 may be, for example, an image generated by using a target image having a high contrast ratio.

A process of generating the training image 320 will be described with reference to FIGS. 4 and 5.

Figure 4:
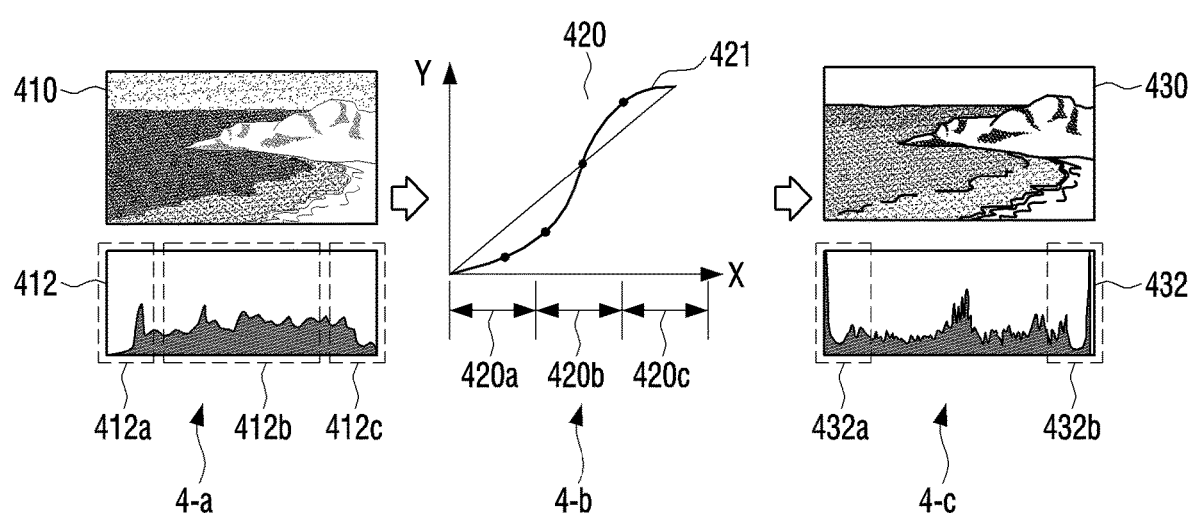
FIG. 4 is a view describing a process of generating a target image having a high contrast ratio by using the electronic device according to an embodiment.

FIG. 4 is a view describing a process of generating a target image having a high contrast ratio by using the electronic device 10 according to an embodiment.

According to an embodiment, the electronic device 10 may acquire an original image 410 having a low contrast ratio. The low contrast ratio may mean, for example, a state in which, in a graph expressing a contrast level using a number of red (R), green (G), and blue (B) pixels included in an image, the number of R, G, and B pixels corresponding to a region expressing a dark tone or a region expressing a bright tone is smaller than the number of R, G, and B pixels corresponding to a region expressing an intermediate tone.

For example, referring to a reference numeral 4-a of FIG. 4, a graph 412 may show a contrast level of the original image 410. A left region 412a of the graph 412 is a region expressing a dark tone, a center region 412b of the graph 412 is a region expressing an intermediate tone, and a right region 412c of the graph 412 is a region expressing a bright tone.

For example, according to the graph 412 showing the contrast level of the original image 410, a plurality of R, G, and B pixels exist in the center region 412b expressing the intermediate tone, but the number of R, G, and B pixels existing in the left region 412a expressing the dark tone and the right region 412c expressing the bright tone is comparatively small.

According to an embodiment, the electronic device 10 may change the contrast ratio of the original image 410 by an external input.

Referring to a reference numeral 4-b of FIG. 4, the electronic device 10 may provide an object 420 that is able to change a contrast ratio of an image according to an external input. The object 420 that is able to change a contrast ratio of an image may include an X axis, a Y axis, and a line 421. According to an embodiment, both the X axis and the Y axis may indicate brightness levels using integers. For example, the integers may be in a range of 0 to 255. That is, a color of a pixel of the image may be based on a value that indicates how much of each of the red, green, and blue is included. The value of the color of the pixel may be stored as an integer. The range of the integer may be 0 to 255, which corresponds to an 8-bit byte. According to an embodiment, an integer of 0 in the brightness level may indicate a darkest black color and an integer of 255 may indicate a brightest white color.

The X axis may indicate an input value and the Y axis may indicate an output value. The object 420 that is able to change a contrast ratio of an image may show a brightness value acquired from the input image by changing it to the output value according to the line 421. Accordingly, when a shape of the line 421 changes, the brightness value of the output image may change. As the brightness value changes, the contrast ratio may change.

According to an embodiment, a user may change a contrast ratio of an image by changing the shape of the line 421 included in the object 420.

According to an embodiment, when a left region 420a of the line 421 included in the object 420 that is able to change a contrast ratio is vertically adjusted along the Y axis, the amount of dark tone included in the image may increase or decrease. In addition, when a right region 420c of the line 421 is vertically adjusted along the Y axis, the amount of bright tone included in the image may increase or decrease. Further, when an intermediate region 420b of the line 421 is vertically adjusted along the Y axis, the amount of intermediate tone included in the image may increase or decrease.

For example, a user may vertically adjust the right region 420c of the line 421 upwards. In this case, the electronic device 10 may increase the output value of the bright tone of the original image 410. The increasing the output value of the bright tone may mean, for example, to express a region expressed in gray close to white in an image, as white sequentially in response to the movement of the line 421.

In addition, a user may vertically adjust the left region 420a of the line 421 downwards. In this case, the electronic device 10 may decrease the output of the dark tone of the original image 410. The decreasing the output value of the dark tone may mean, for example, to express a region expressed in gray close to black in an image, as black sequentially in response to the movement of the line 421.

As the output value of the bright tone increases and the output value of the dark tone decreases, the contrast difference of the original image 410 increases. That is, with an increase in difference between the region expressed in color close to black and the region expressed in color close to white in the image, a contrast ratio which is a difference between a region expressed in black and a region expressed in white may increase.

According to an embodiment, a user may adjust the original image 410 to have a contrast ratio desired by a user through the process of changing the shape of the line 421 as described above.

Referring to reference numeral 4-c of FIG. 4, the electronic device 10 may generate a target image 430 having a changed contrast ratio. The target image 430 may be an image having an increased contrast ratio compared to the original image 410.

For example, when comparing a graph 432 showing a contrast level of the target image 430 with the graph 412 showing the contrast level of the original image 410, an increase in the number corresponding to R, G, and B color of the pixels may be confirmed in a left region 432a expressing a dark tone and a right region 432b expressing a bright tone.

As described above, according to various embodiments of the disclosure, the electronic device 10 may acquire the target image 430 to which a preference of a user is reflected in response to an input of a user.

Figure 5A:
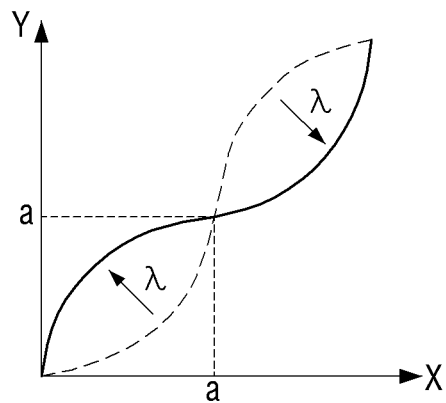
FIGS. 5A and 5B are views describing a process of generating a training image having a low contrast ratio by using the electronic device according to an embodiment.
Figure 5B:
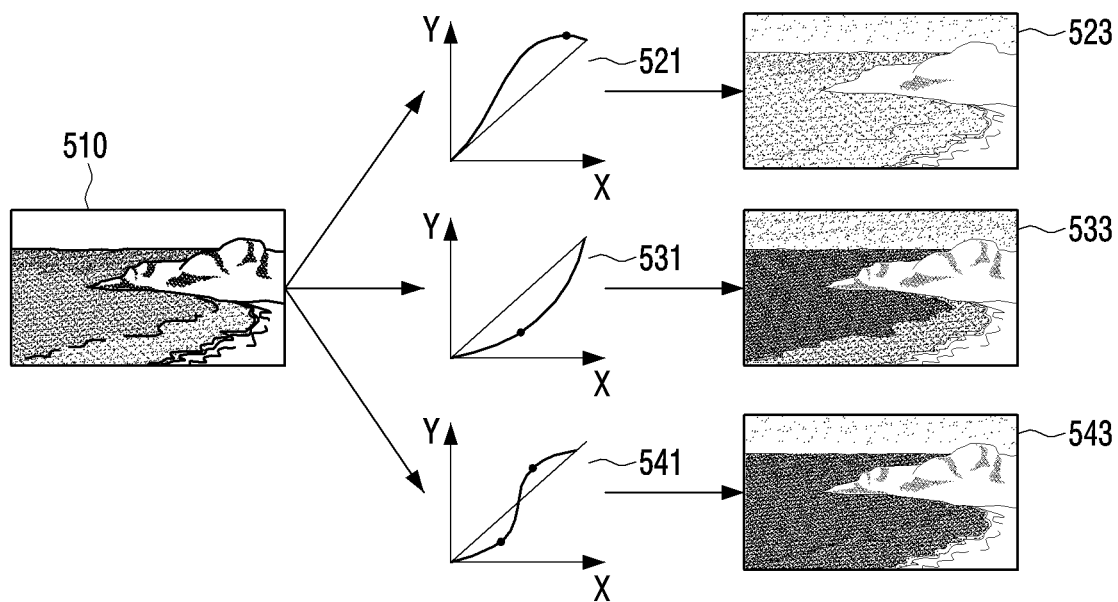

FIGS. 5A and 5B are views describing a process of generating a training image having a low contrast ratio by using the electronic device 10 according to an embodiment.

According to an embodiment, the electronic device 10 may acquire the target image 430 having a high contrast ratio by using the process described in FIG. 4.

Referring to FIG. 5A, the electronic device 10 may acquire an image having a decreased contrast ratio (e.g., an image having a low contrast ratio) by applying the target image 430 having a high contrast ratio to a monotonically increasing function (degrade CE curve) such as an expression. For example, the electronic device 10 may acquire an average brightness value of an input image. The electronic device 10 may adjust a brightness value of pixels having a higher brightness value than the average brightness value to be lower among pixels included in the input image. For example, the electronic device 10 may adjust a brightness value of pixels having a lower brightness value than the average brightness value to be higher among pixels included in the input image.

According to an embodiment, the electronic device 10 may generate a plurality of monotonically increasing functions by changing an a value and a λ value included in the expression. According to an embodiment, the electronic device 10 may generate 100 monotonically increasing functions by combining 10 α values and 10 λ values. According to an embodiment, the electronic device 10 may acquire 100,000 images having a decreased contrast ratio by combining the 100 monotonically increasing functions and 1,000 target images.

Referring to FIG. 5B, the electronic device 10 may generate a first monotonically increasing function 521 in which the α value is 0 and the α value is 1. According to an embodiment, the electronic device 10 may generate a first training image having a decreased contrast ratio (e.g., a first training image having a low contrast ratio) 523 by applying a target image 510 to the first monotonically increasing function 521. According to an embodiment, the target image 510 may correspond to the target image 420 of FIG. 4.

According to the various embodiments, the electronic device 10 may generate a second monotonically increasing function 531 in which the α value is 1 and the λ value is 1. According to an embodiment, the electronic device 10 may generate a second training image having a decreased contrast ratio (e.g., a second training image having a low contrast ratio) 533 by applying the target image 510 to the second monotonically increasing function 531.

According to various embodiments, the electronic device 10 may generate a third monotonically increasing function 541 in which the α value is 0.5 and the λ value is 1. According to an embodiment, the electronic device 10 may generate a third training image having a decreased contrast ratio (e.g., a third training image having a low contrast ratio) 543 by applying the target image 510 to the third monotonically increasing function 541.

As described above, according to various embodiments of the disclosure, the electronic device 10 may generate a plurality of training images using one original image and monotonically increasing functions matched with the training images, respectively. By doing so, the electronic device 10 may acquire a large number of pieces of training data to be applied to the learning model (e.g., learning model 310 of FIG. 3).

Referring to FIG. 3, the electronic device 10 may train the learning model 310 by inputting the learning model 310 and the training data (e.g., training image 320 and the inverse function 330 of the monotonically increasing function) to the learning machine 340.

The inverse function 330 of the monotonically increasing function may be, for example, a function for increasing a contrast ratio of an input image as an inverse function of the monotonically increasing function for decreasing a contrast ratio of the input image described in FIGS. 5A and 5B.

As described in FIGS. 5A and 5B, the electronic device 10 may generate a plurality of monotonically increasing functions by changing the α value and the λ value included in the expression of FIG. 5A, and may generate training images by using the plurality of generated monotonically increasing functions. For example, the electronic device 10 may acquire the first monotonically increasing function 521, the second monotonically increasing function 531, or the third monotonically increasing function 541 and acquire the first training image 523, the second training image 533, or the third training image 543 corresponding thereto, respectively.

According to an embodiment, the electronic device 10 may generate an inverse function corresponding to each of the first monotonically increasing function 521, the second monotonically increasing function 531, or the third monotonically increasing function 541. According to an embodiment, the electronic device 10 may make the generated inverse function of the first monotonically increasing function 521 correspond to the first training image and use these as training data. In addition, the electronic device 10 may make the generated inverse function of the second monotonically increasing function 531 correspond to the second training image and use these as training data. Further, the electronic device 10 may make the generated inverse function of the second monotonically increasing function 541 correspond to the third training image and use these as training data.

According to an embodiment, the learning machine 340 may execute the training by applying the plurality of training images 320 and the plurality of inverse functions 330 of the monotonically increasing functions corresponding to the plurality of training images 320 respectively to the learning model 310.

According to an embodiment, the learning machine 340 may train the learning model 310 to have a reference to predict the inverse function of the monotonically increasing function corresponding to the input image. According to an embodiment, the learning machine 340 may train the learning model to have a reference regarding which training data is to be used to predict the inverse function of the monotonically increasing function corresponding to the input image or how the learning model predicts the inverse function of the monotonically increasing function using the training data.

According to an embodiment, when the training of the learning model 310 is completed for a predetermined period of time or using a predetermined amount of training data, the learning machine 340 may generate a learning model 350 which predicts a function (e.g., inverse function of monotonically increasing function) for increasing a contrast ratio of an input image according to a preference of a user, from the general learning model 310.

However, there is no limitation thereto. According to an embodiment, the learning machine 340 may modify (or change, update) the general learning model 310 to the learning model 350 which predicts a function for increasing a contrast ratio of an input image according to a preference of a user.

According to an embodiment, the electronic device 10 may store the generated (or updated, modified, changed) learning model 350 in the memory 220. However, there is no limitation thereto. For example, the electronic device 10 may store the learning model 350 in the GPU 230.

As described above, according to an embodiment of the disclosure, the electronic device 10 may use the input image and the inverse function of the monotonically increasing function corresponding to the input image as the training data. By doing so, the electronic device 10 may significantly decrease an amount of the memory 220 used in the process of training the learning model 310, compared to a method for training the learning model 310 using the input image and the output image.

In addition, according to an embodiment of the disclosure, the electronic device 10 may easily acquire a plurality of monotonically increasing functions and a plurality of training images using the plurality of monotonically increasing functions by using a target image obtained according to a preference of a user.

Figure 6:
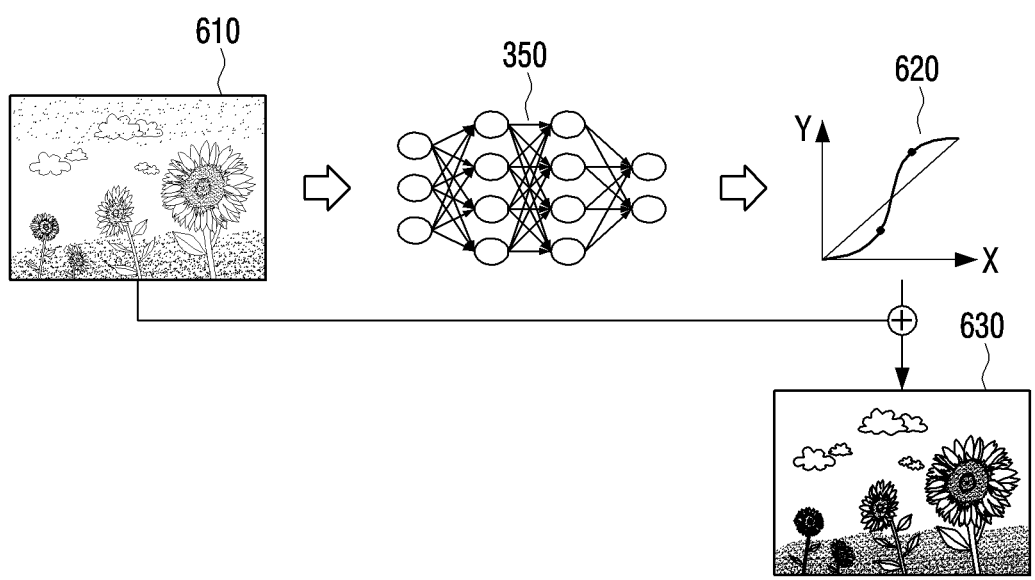
FIG. 6 is a view describing a situation in which an output image having an increased contrast ratio is generated by using a learning model of the electronic device according to an embodiment.

FIG. 6 is a view describing a situation in which an output image having an increased contrast ratio is generated by using the learning model of the electronic device according to an embodiment.

Referring to FIG. 6, the electronic device 10 may acquire an input image 610.

According to an embodiment, the electronic device 10 may receive the input image 610 from an external device performing communication. In addition, the electronic device 10 may receive the input image 610 in a streaming form from an external device performing communication. According to various embodiments, the electronic device 10 may identify one of images stored in the memory 220 in advance as the input image 610.

According to an embodiment, the electronic device 10 may apply the input image 610 to the learning model 350. The learning model 350 may be, for example, the learning model set to predict the inverse function of the monotonically increasing function corresponding to the input image described in FIG. 3.

According to an embodiment, the electronic device 10 may acquire an inverse function 620 of a monotonically increasing function predicted to correspond to the input image 610 as a result of application of the input image 610 to the learning model 350.

According to an embodiment, the electronic device 10 may apply the input image 610 to the acquired inverse function 620 of the monotonically increasing function. The electronic device 10 may acquire an output image 630 having an increased contrast ratio than that of the input image 610 as a result of the application of the input image 610 to the inverse function 620 of the monotonically increasing function.

Figure 7A:
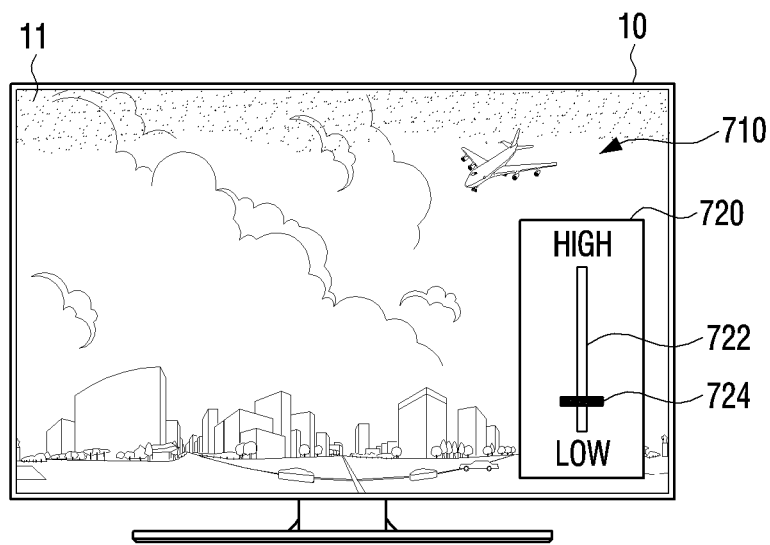
FIGS. 7A and 7B are views describing a situation in which a contrast ratio of an output image is adjusted again by using the electronic device according to an embodiment.
Figure 7B:
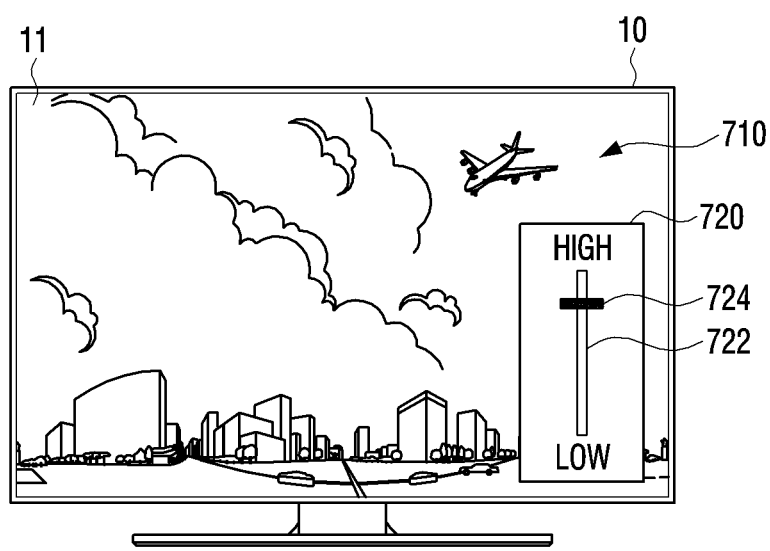

FIGS. 7A and 7B are views describing a situation in which a contrast ratio of an output image is adjusted again by using the electronic device according to an embodiment.

Referring to FIG. 7A, the electronic device 10 may display an output image 710 on the display 11. According to an embodiment, the output image 710 may be, for example, an image acquired by predicting an inverse function of a monotonically increasing function corresponding to an input image and applying the input image to the predicted inverse function of the monotonically increasing function by the electronic device 10, as described in FIG. 6.

According to an embodiment, the electronic device 10 may display an object 720 that is able to adjust a contrast ratio of the output image 710 on the display 11. For example, the electronic device 10 may display the output image 710 and display the object 720 that is able to adjust a contrast ratio at the same time or sequentially. In addition, the electronic device 10 may display the object 720 adjusting a contrast ratio in response to a user input requesting function execution, according to an embodiment.

According to an embodiment, the object 720 adjusting a contrast ratio may include a bar 722 (e.g., a slide bar) displaying a contrast ratio, and a moving portion 724 that is able to adjust the contrast ratio according to the bar 722. For example, if a user moves the moving portion 724 to the upper side of the bar 722, the electronic device 10 may display an image on the display 11 by increasing a contrast ratio of the image. For example, if a user moves the moving portion 724 to the lower side of the bar 722, the electronic device 10 may display an image on the display 11 by decreasing a contrast ratio of the image.

Referring to FIG. 7B, the electronic device 10 may change the contrast of the output image 710 displayed on the display 11 in response to an input of a user for moving the moving portion 724 to the upper side of the bar 722.

According to various embodiments, the electronic device 10 may provide a touchscreen display capable of a touch input as the display 11. In this case, the electronic device 10 may increase the contrast ratio of the output image 710 in response to a touch-and-drag input of a user for moving the moving portion 724 displayed on the touchscreen display to the upper side.

According to various embodiments, the electronic device 10 may perform communication with a remote controller which controls the electronic device 10. According to an embodiment, the electronic device 10 may increase the contrast ratio of the output image 710 in response to an input of a user for moving the moving portion 724 to the upper side by manipulating the remote controller. In addition, the electronic device 10 may change the contrast ratio of the output image 710 in response to an input of a user by manipulating an external electronic device (e.g., smartphone, tablet PC, or the like) performing the communication with the electronic device 10.

According to various embodiments, the electronic device 10 may acquire a speech of a user and identify a content of the speech by recognizing the speech. In this case, the electronic device 10 may increase the contrast ratio of the output image 710 by moving the moving portion 724 to the upper side in response to the speech of a user.

According to an embodiment, when the contrast ratio of the output image 710 is modified in response to an input of a user, the electronic device 10 may change the inverse function of the monotonically increasing function predicted and corresponded to the input image, to correspond to the modified contrast ratio. The electronic device 10 may train the learning model 350 by using the changed inverse function of the monotonically increasing function and the input image as the training data.

According to an embodiment, the electronic device 10 may perform the training by matching an inverse function of a monotonically increasing function modified according to a preference of a user with an input image, the learning model 350 may predict an inverse function of a monotonically increasing function corresponding to a recent preference of a user with respect to an input image subsequently input, and the electronic device 10 may generate an output image corresponding to the recent preference of a user.

Figure 8:
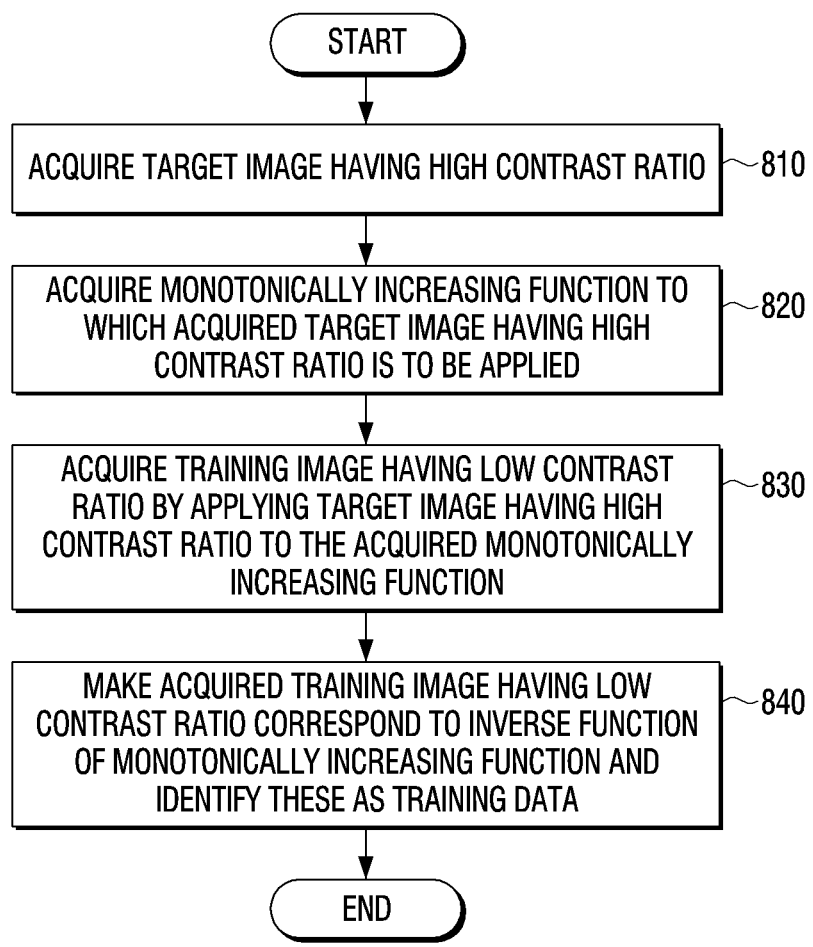
FIG. 8 is a flowchart describing a situation in which the electronic device identifies training data according to an embodiment.

FIG. 8 is a flowchart describing a situation in which the electronic device identifies the training data according to an embodiment.

The electronic device 10 may acquire a target image having a high contrast ratio (810).

For example, a user may store an original image having a low contrast ratio in the electronic device 10 and adjust the contrast ratio of the original image having a low contrast ratio by using a program for changing a contrast ratio included in the electronic device 10, to generate a target image having a high contrast ratio.

Next, the electronic device 10 may acquire a monotonically increasing function to which the acquired target image having a high contrast ratio is to be applied (820).

For example, the electronic device 10 may acquire the monotonically increasing function for decreasing the contrast ratio. The electronic device 10 may acquire a plurality of monotonically increasing functions by changing at least one or more constant values included in the monotonically increasing function.

Next, the electronic device 10 may acquire the training image having a low contrast ratio by applying the target image having a high contrast ratio to the monotonically increasing function (830).

For example, the electronic device 10 may acquire a plurality of training images by applying the target image to the plurality of acquired monotonically increasing functions. The training image may have a contrast ratio decreased compared to that of the target image by the monotonically increasing function.

Lastly, the electronic device 10 may make the acquired training image having a low contrast ratio correspond to the inverse function of the monotonically increasing function and identify these as the training data (840).

For example, the electronic device 10 may acquire the inverse function corresponding to the monotonically increasing function with which the training image is generated. The electronic device 10 may make the training image acquired by using the monotonically increasing function correspond to the inverse function of the monotonically increasing function and acquire the training data for training the learning model. The electronic device 10 may acquire a plurality of pieces of training data by repeating the above process and train the learning model.

Figure 9:
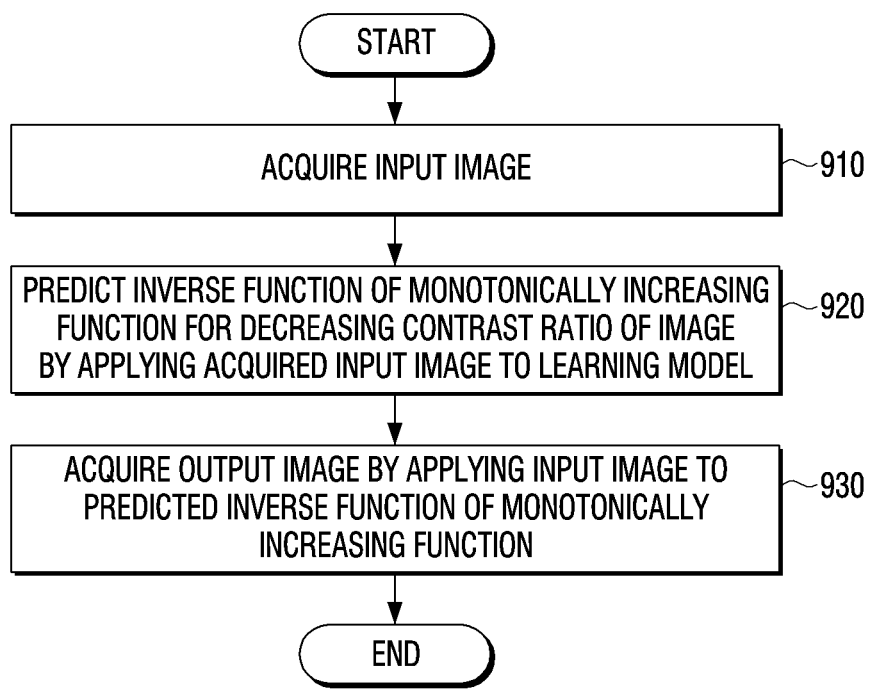
FIG. 9 is a flowchart describing a situation in which the electronic device generates an output image according to an embodiment.

FIG. 9 is a flowchart describing a situation in which the electronic device generates an output image according to an embodiment.

The electronic device 10 may acquire an input image (910).

For example, the electronic device 10 may receive the input image from an external device performing communication. In addition, the electronic device 10 may receive the input image in a streaming form from an external device performing communication. According to various embodiments, the electronic device 10 may identify one input image from images stored in the memory in advance.

Next, the electronic device 10 may predict an inverse function of a monotonically increasing function for decreasing a contrast ratio of an image by applying the acquired input image to a learning model (920).

The learning model may be, for example, a learning model set to predict an inverse function of a monotonically increasing function corresponding to the input image described in FIG. 3.

The electronic device 10 may then acquire an output image by applying the input image to the predicted inverse function of the monotonically increasing function (930).

Figure 10:
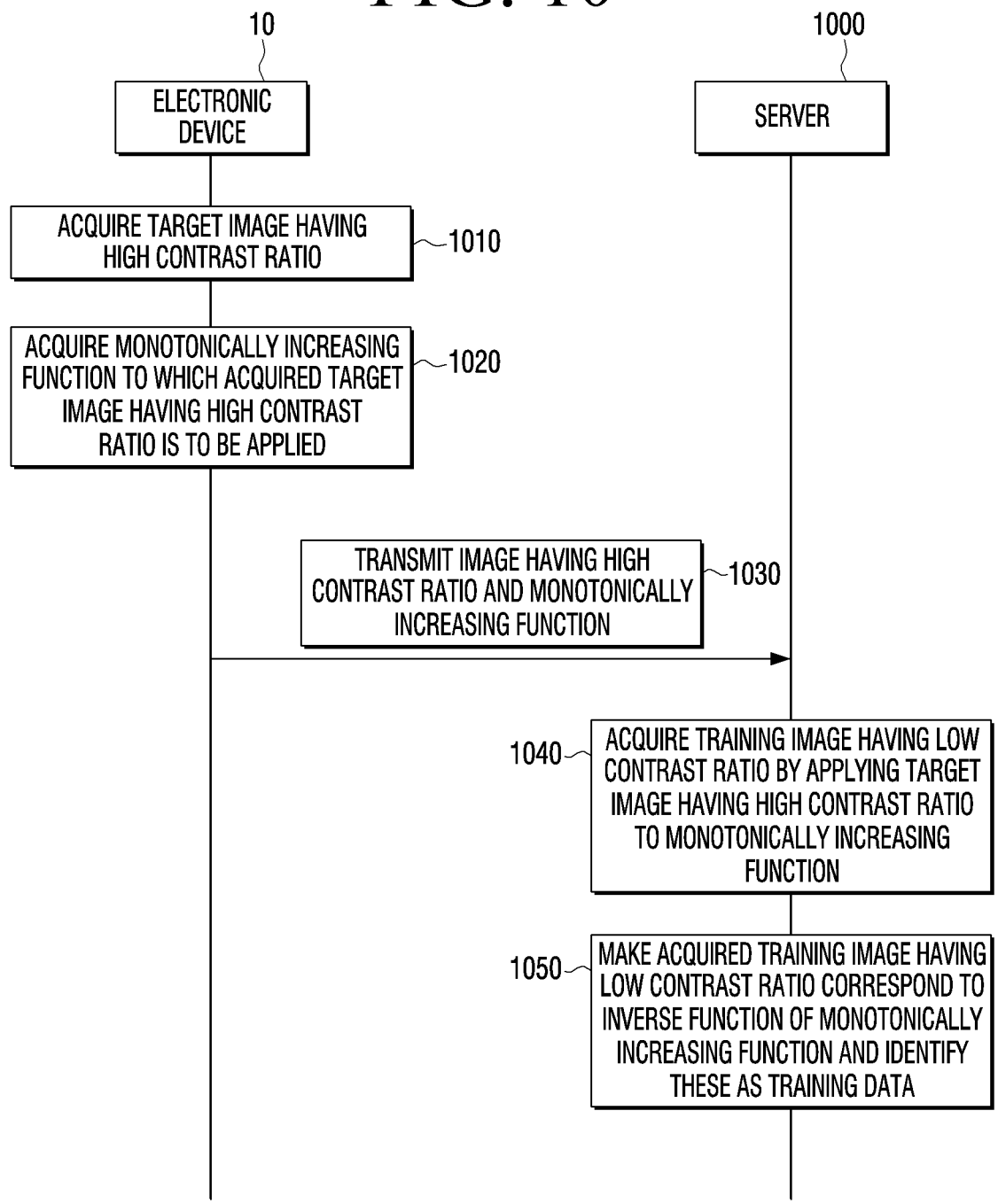
FIG. 10 is a flowchart describing a situation in which the electronic device identifies training data in association with a server according to an embodiment.

FIG. 10 is a flowchart describing a situation in which the electronic device identifies training data in association with a server according to an embodiment.

According to an embodiment, the learning model may be positioned in an external server 1000. In this case, the learning model may be stored in a memory of the server 1000 as software or may be implemented as hardware which is a part of artificial intelligence chip of the server.

The electronic device 10 may acquire a target image having a high contrast ratio (1010).

For example, a user may store an original image having a low contrast ratio in the electronic device 10 and adjust the contrast ratio of the original image having a low contrast ratio by using a program for changing a contrast ratio included in the electronic device 10, to generate a target image having a high contrast ratio.

Next, the electronic device 10 may acquire a monotonically increasing function to which the acquired target image having a high contrast ratio is to be applied (1020).

For example, the electronic device 10 may acquire a monotonically increasing function for decreasing a contrast ratio. The electronic device 10 may acquire a plurality of monotonically increasing functions by changing at least one or more constant values included in the monotonically increasing function.

The electronic device 10 may transmit the image having a high contrast ratio and the monotonically increasing function acquired to the server 1000 (1030).

The server 1000 may acquire a training image having a low contrast ratio by applying the target image having a high contrast ratio to the monotonically increasing function (1040).

For example, the server 1000 may acquire a plurality of training images by applying the target image to the plurality of acquired monotonically increasing functions. The training image may have a contrast ratio decreased compared to that of the target image by the monotonically increasing function.

The server 1000 may make the acquired training image having a low contrast ratio correspond to the inverse function of the monotonically increasing function and identify these as the training data (1050).

For example, the server 1000 may acquire an inverse function corresponding to the monotonically increasing function with which the training image is generated. The server 1000 may make the training image acquired by using the monotonically increasing function correspond to the inverse function of the monotonically increasing function and acquire the training data for training the learning model. The server 1000 may acquire a plurality of pieces of training data by repeating the above process and train the learning model.

Figure 11:
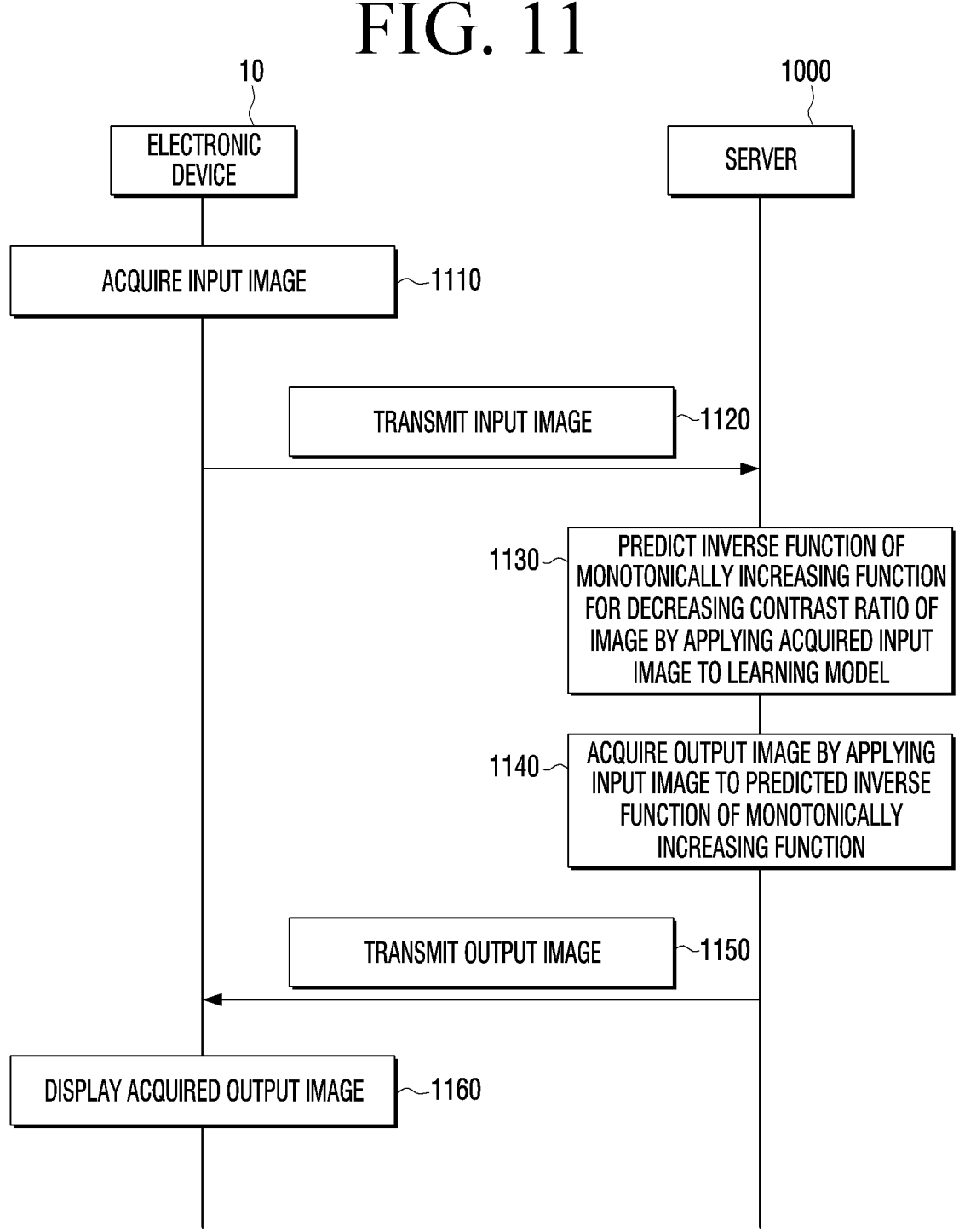
FIG. 11 is a flowchart describing a situation in which the electronic device generates an output image in association with a server according to an embodiment.

FIG. 11 is a flowchart describing a situation in which the electronic device generates an output image in association with the server according to an embodiment.

the electronic device 10 may acquire an input image (1110).

For example, the electronic device 10 may receive the input image from an external device performing communication. In addition, the electronic device 10 may receive the input image in a streaming form from an external device performing communication. According to various embodiments, the electronic device 10 may identify one of images stored in the memory in advance as the input image.

Next, the electronic device 10 may transmit the input image to the server 1000 (1120).

The server 1000 may predict an inverse function of a monotonically increasing function for decreasing a contrast ratio of an image by applying the acquired input image to a learning model (1030).

The learning model may be, for example, a learning model set to predict an inverse function of a monotonically increasing function corresponding to the input image described in FIG. 3.

The server 1000 may acquire an output image by applying the input image to the predicted inverse function of the monotonically increasing function (1140).

The server 1000 may transmit the acquired output image to the electronic device 10 (1150).

The electronic device 10 may then display the acquired output image (1160).

Figure 12:
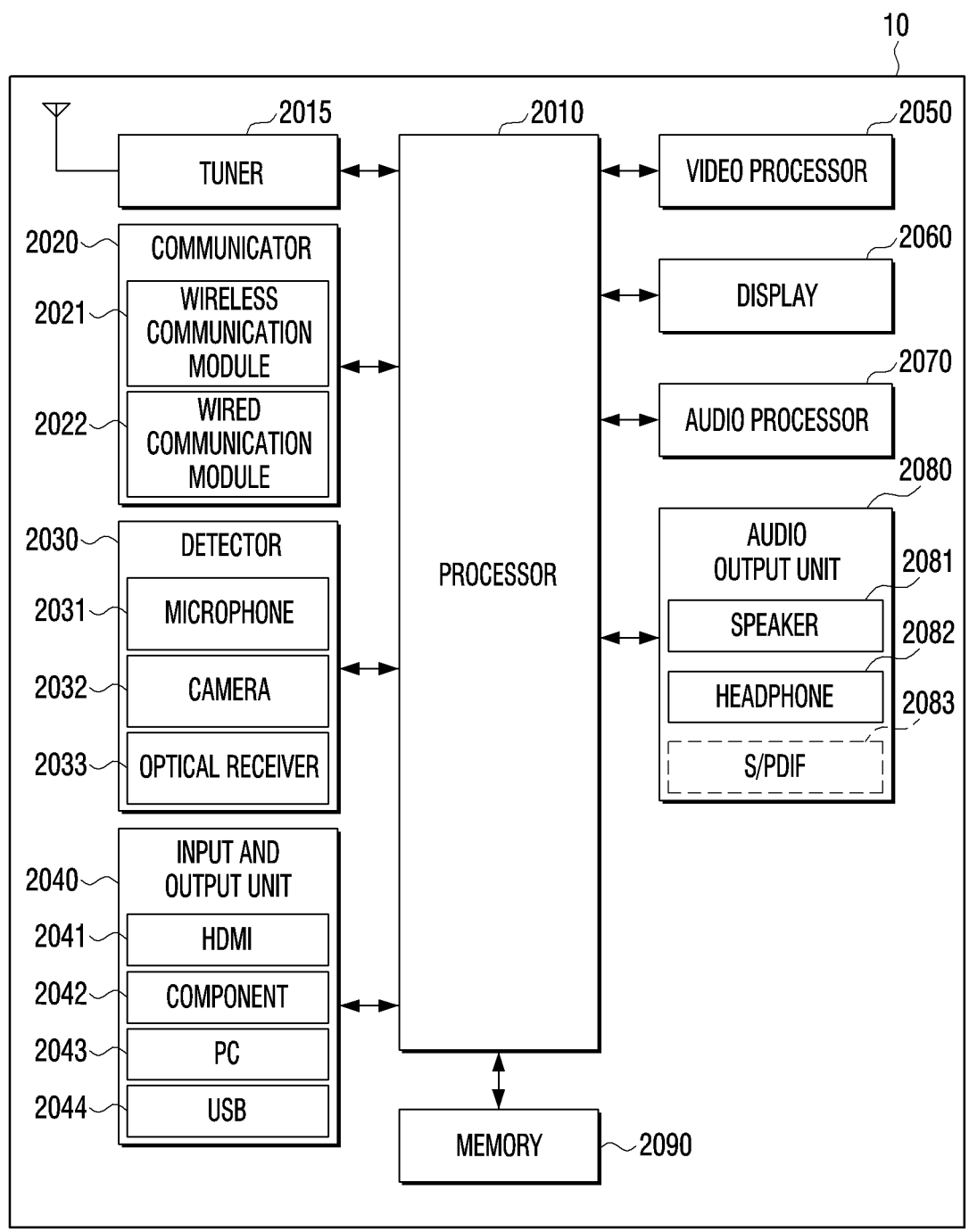
FIG. 12 is a block diagram of an electronic device according to an embodiment.

FIG. 12 is a block diagram of the electronic device according to an embodiment.

As shown in FIG. 12, the electronic device 10 may further include at least one of a memory 2090, a tuner 2015, a detector 2030, an input and output unit 2040, a video processor 2050, an audio processor 2070, and an audio output unit 2080, in addition to a processor 2010, a communicator 2020, and a display 2060.

The processor 2010, the memory 2090, and the display 2060 may correspond to the processor 210, the memory 220, and the display 240 of FIG. 2, respectively, and thus the overlapped description as described above will be omitted.

According to an embodiment, the processor 2010 may, for example, control at least one of other components (e.g., hardware or software components) of the electronic device 10 connected to the processor 2010 by executing software (e.g., programs) stored in the memory 2090, and execute various data processing or calculations. According to an embodiment, the processor 2010 may load an instruction or data received from another component to the memory (e.g., volatile memory) 2090, process the instruction or data stored in the memory 2090, and store result data in a memory (e.g., non-volatile memory) as at least a part of the data processing or calculation. According to an embodiment, the processor 2010 may include a main processor (e.g., a central processing unit or an application processor) and a coprocessor operating independently or together therewith (e.g., a graphic processor, an image signal processor, a sensor hub processor, or a communication processor). Additionally or alternatively, the coprocessor may use low power than the main processor or may be set to be specialized in a designated function. The coprocessor may be implemented separately from the main processor or a part thereof. For example, the coprocessor may control a part of a function or a state related to at least one component among the components of the electronic device 10 as a substitute of the main processor while the main processor is inactive (e.g., sleep) or together with the main processor while the main processor is active (e.g., application execution).

The communicator 2020 may connect the electronic device 10 to at least one external device (e.g., server 1000) under the control of the processor 2010. The communicator 2020 may include at least one or more communication processor operated independently from the processor 2010 (e.g., application processor) and supporting direct (e.g., wired) communication or wireless communication. According to an embodiment, the communicator 2020 may include a wireless communication module 2021 (e.g., a cellular communication module, a short-range wireless communication module, or a global navigation satellite system (GNSS) communication module) or a wired communication module 2022 (e.g., a local area network (LAN) v or a power line communication module). The corresponding communication module among these communication modules may communicate with the server 20 via a first network (e.g., short-range communication data network such as Bluetooth, Wi-Fi direct or infrared data association (IrDA)) or a second network (e.g., long-range communication network such as cellular network, the Internet or computer network (e.g., LAN or WAN)). Such various kinds of communication modules may be integrated as one component (e.g., single chip) or implemented as a plurality of separated components (e.g., a plurality of chips).

The display 2060 may visually provide information (e.g., UI or the like) to outside (e.g., user) of the electronic device 10, according to an embodiment. When the display 2060 and a touch pad form a layered structure to constitute a touch screen, the display 2060 may be used as an input device in addition to the output device, according to an embodiment. The display 2060 may include at least one of a liquid crystal display, a thin film transistor-liquid crystal display, an organic light-emitting diode, a flexible display, a 3D display, and an electrophoretic display. In addition, according to the implemented form of the electronic device 10, the electronic device 10 may include two or more displays 2060.

The tuner 2015 may tune and select only a frequency of a channel to be received by the electronic device 10 among a plurality of radio wave components through amplification, mixing, and resonance of a broadcast signal received in a wired or wireless manner. The broadcast signal may include sounds, videos, and additional information (e.g., electronic program guide (EPG).

The broadcast signal received through the tuner 2015 may be separated into the sound, the video, and/or the additional information by decoding (e.g., audio decoding, video decoding, or additional information decoding). The separated audio, video, and/or additional information may be stored in the memory 2090 under the control of the processor 2010. The number of tuner 2015 of the electronic device 10 may be one or more. The tuner 2015 may be implemented as a component of the all-in-one electronic device 10, or may be implemented as a separate device including a tuner electrically connected to the electronic device 10 or a tuner (not shown) connected to the input and output unit 2040.

The detector 2030 may detect a user's speech, a user's image, or a user's interaction and may include a microphone 2031, a camera 2032, and an optical receiver 2033.

The microphone 2031 receives speech uttered by a user. The microphone 2031 may convert the received speech into an electrical signal and output this to the processor 2010.

The camera 2032 may receive an image (e.g., continuous frame) corresponding to a user's motion including a gesture within a camera recognition range. The optical receiver 2033 may receive an optical signal (including control signal) received from an external control device (e.g., remote controller). The optical receiver 2033 may receive an optical signal corresponding to a user input (e.g., touch, press, touch gesture, speech, or motion) from a control device. A control signal may be extracted from the received optical signal under the control of the processor 2010.

The input and output unit 2040 may receive videos (e.g., moving image and the like), sounds (e.g., speech, music, and the like), and additional information (e.g., EPG and the like) from the outside of the electronic device 10 under the control of the processor 2010. The input and output unit 2040 may include one of a High-Definition Multimedia Interface port (HDMI port) 2041, a component jack 2042, a PC port 2043, and a USB port 2044. The input and output unit 2040 may include a combination of the HDMI port 2041, the component jack 2042, the PC port 2043, and the USB port 2044.

The video processor 2050 may process an image to be displayed on the display 2060 and execute various image processing such as decoding, scaling, noise filtering, frame rate conversion, resolution conversion, and the like with respect to video data.

The audio processor 2070 may execute a process with respect to audio data. The audio processor 2070 may execute various processing such as decoding, amplification, noise filtering, and the like with respect to the audio data.

The audio output unit 2080 may output sounds included in the broadcast signal received through the tuner 2015, sounds input through the communicator 2020 or the input and output unit 2040, and sounds stored in the memory 2090 under the control of the processor 2010. The audio output unit 2080 may include at least one of a speaker 2081, a headphone output terminal 2082, or Sony/Philips Digital Interface (S/PDIF: output terminal) 2083.

The memory 2090 according to an embodiment may store a program for processing and control of the processor 2010 and may store data input to the electronic device 10 or output from the electronic device 10.

The memory 2090 may include at least one type of storage medium such as a memory of a flash memory type, a hard disk type, a multimedia card micro type, or a card type (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Various embodiments of the disclosure may be implemented as software including instructions stored in a machine (e.g., electronic device 10)-readable storage medium (e.g., memory 220). For example, a processor (e.g., processor 210) of the machine (e.g., electronic device 10) may invoke at least one instruction of one or more instructions stored in the storage medium and may execute this. This allows the machine to be operated to execute at least one function according to the at least one invoked instruction. The one or more instructions may include a code generated by a compiler or executed by an interpreter. The machine-readable storage medium may be provided in a form of a non-transitory storage medium. Herein, the term "non-transitory" merely mean that the storage medium is tangible while not including signals (e.g., electromagnetic waves), and it does not distinguish that data is semi-permanently or temporarily stored in the storage medium.

According to an embodiment, the methods according to various embodiments disclosed in this disclosure may be provided to be included in a computer program product. The computer program product may be exchanged between a seller and a purchaser as a commercially available product. The computer program product may be distributed in the form of a machine-readable storage medium (e.g., compact disc read only memory (CD-ROM)) or distributed online through an application store (e.g., PlayStore™) or directly between two user devices (e.g., smartphones). In a case of the on-line distribution, at least a part of the computer program product may be at least temporarily stored or temporarily generated in a storage medium such as a memory of a server of a manufacturer, a server of an application store, or a relay server.

According to various embodiments, each of the elements (e.g., a module or a program) described above may be composed of a single entity or a plurality of entities. According to various embodiments, one or more elements or operations of the abovementioned elements may be omitted or one or more other elements or operations may be further added. Alternatively or additionally, a plurality of elements (e.g., modules or programs) may be integrated into one element. In such a case, the integrated element may perform one or more functions of each of the plurality of elements performed in the same or similar manner as performed by the element of the plurality of elements prior to integration. Operations performed by a module, a program, or other elements, in accordance with various embodiments, may be performed sequentially, in a parallel, repetitive, or heuristically manner, or at least some operations may be performed in a different order, omitted, or may add a different operation.

What is claimed is:

1. An electronic device comprising:
   at least one processor; and
   at least one memory configured to store instructions,
   wherein the at least one processor is configured to execute the instructions stored in the at least one memory, to:
      obtain an input image,
      predict an inverse function of a monotonically increasing function for decreasing an image contrast ratio by applying the input image to a learning model trained by using an artificial intelligence algorithm, and
      obtain an output image based on the input image and the predicted inverse function of the monotonically increasing function, and
   wherein the learning model is trained to predict the inverse function of the monotonically increasing function for decreasing the image contrast ratio based on a training image generated by applying the monotonically increasing function to a target image having a high contrast ratio and the inverse function of the monotonically increasing function as training data.

2. The electronic device according to claim 1, wherein the at least one processor is further configured to generate the output image having an increased contrast ratio by applying the input image to the predicted inverse function of the monotonically increasing function.

3. The electronic device according to claim 2, further comprising:
   a display,
   wherein the at least one processor is further configured to control the display to display the output image and an object for adjusting a contrast ratio of the output image.

4. The electronic device according to claim 3, wherein the at least one processor is further configured to control the display to display the output image by adjusting the contrast ratio of the output image based on receiving an external input by using the object.

5. The electronic device according to claim 4, wherein the at least one processor is further configured to:
reflect the adjusted contrast ratio to the predicted inverse function of the monotonically increasing function, and
use the input image and the inverse function of the monotonically increasing function for the adjusted contrast ratio as the training data.

6. The electronic device according to claim 1, wherein the at least one processor is further configured to train the learning model by inputting the training image, the inverse function of the monotonically increasing function, and the learning model to a learning machine.

7. The electronic device according to claim 1, wherein the monotonically increasing function comprises at least one constant value, and
wherein the at least one processor is further configured to obtain a plurality of monotonically increasing functions by changing the at least one constant value.

8. The electronic device according to claim 7, wherein the at least one processor is further configured to obtain a plurality of training images by applying the target image to the plurality of monotonically increasing functions.

9. The electronic device according to claim 1, wherein the at least one processor is further configured to adjust a brightness value of pixels having a higher brightness value than an average brightness value of pixels included in the input image to be lower by using the monotonically increasing function.

10. The electronic device according to claim 1, wherein the at least one processor is further configured to adjust a brightness value of pixels having a lower brightness value than an average brightness value of pixels included in the input image to be higher by using the monotonically increasing function.

11. A method for controlling an electronic device, the method comprising:
based on a target image having a high contrast ratio being obtained, obtaining a monotonically increasing function for decreasing an image contrast ratio;
obtaining a training image having a low contrast ratio by applying the monotonically increasing function to the target image; and
using the training image and an inverse function of the monotonically increasing function as training data for a learning model for increasing a contrast ratio of an input image.

12. The method according to claim 11, further comprising:
predicting the inverse function of the monotonically increasing function for decreasing the image contrast ratio by applying the input image to the learning model trained using the training data.

13. The method according to claim 12, further comprising:
generating an output image having an increased contrast ratio by applying the input image to the predicted inverse function of the monotonically increasing function.

14. The method according to claim 13, further comprising:
displaying an object for adjusting a contrast ratio of the output image together with the output image.

15. The method according to claim 14, further comprising:
providing the output image by adjusting the contrast ratio of the output image based on receiving an external input by using the object.

16. The method according to claim 15, further comprising:
reflecting the adjusted contrast ratio to the predicted inverse function of the monotonically increasing function; and
using the input image and the inverse function of the monotonically increasing function for the adjusted contrast ratio as the training data.

17. The method according to claim 11, further comprising:
training the learning model by inputting the training image, the inverse function of the monotonically increasing function, and the learning model to a learning machine.

18. The method according to claim 11, wherein the monotonically increasing function comprises at least one constant value, and
wherein the method further comprises obtaining a plurality of monotonically increasing functions by changing the at least one constant value.

19. The method according to claim 18, further comprising:
obtaining a plurality of training images by applying the target image to the plurality of monotonically increasing functions.

20. The method according to claim 11, further comprising:
adjusting a brightness value of pixels having a higher brightness value than an average brightness value of pixels included in the input image to be lower or adjusting a brightness value of pixels having a lower brightness value than the average brightness value of pixels included in the input image to be higher by using the monotonically increasing function.

* * * * *